Oct. 11, 1932.                    W. JAY                      1,882,323
                     KNEE CONTROL STEERING ATTACHMENT
                     Filed Oct. 5, 1931      2 Sheets-Sheet 1

INVENTOR
Webb Jay
BY
ATTORNEY

Oct. 11, 1932.    W. JAY    1,882,323
KNEE CONTROL STEERING ATTACHMENT
Filed Oct. 5, 1931    2 Sheets-Sheet 2

INVENTOR
Webb Jay
BY
ATTORNEY

Patented Oct. 11, 1932

1,882,323

UNITED STATES PATENT OFFICE

WEBB JAY, OF MIAMI BEACH, FLORIDA

KNEE CONTROL STEERING ATTACHMENT

Application filed October 5, 1931. Serial No. 566,984.

This invention relates to attachments for motor vehicles to enable the steering mechanism to be held steady even though the hands of the driver are removed from the wheel.

It is sometimes desirable or necessary for the driver of a car to remove his hands from the steering wheel while the car is in motion, as for the purpose of adjusting his eye glasses, lighting a cigarette, reading a road map or some similar operation which requires the use of the hands. In such cases there is danger of the unguided wheels striking an obstruction etc. in their path which would deflect them and cause the car to swerve to one side or the other with probably disastrous consequences.

The principal object of my invention is to provide an attachment for the steering wheel, adapted to be selectively engaged with a knee of the driver and so arranged that the wheel may be held steady and consequently the front wheels maintained in a proper straight-ahead position. While the main function of the device is to hold the front wheels against lateral deflection, said wheels may be turned to a certain extent by the knee action, but it is not intended that sharp turns shall be executed with this attachment.

In connection with the attachment I have therefore provided a means for holding the knee engaging element out of the way of the driver when its use is not desired, and for also automatically retracting the element from its normal position when a sharp turn is being made, so that the device cannot possibly catch against some fixed part of the car when the element is turned with the relatively large amount of turning of the steering wheel then necessitated.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Referring now more particularly to the characters of reference on the drawings, the numeral 1 denotes a split clamping ring adapted to extend about and be clamped to the hub 2 of the steering wheel 3 which is above the stationary steering column or post 4.

Figure 1:
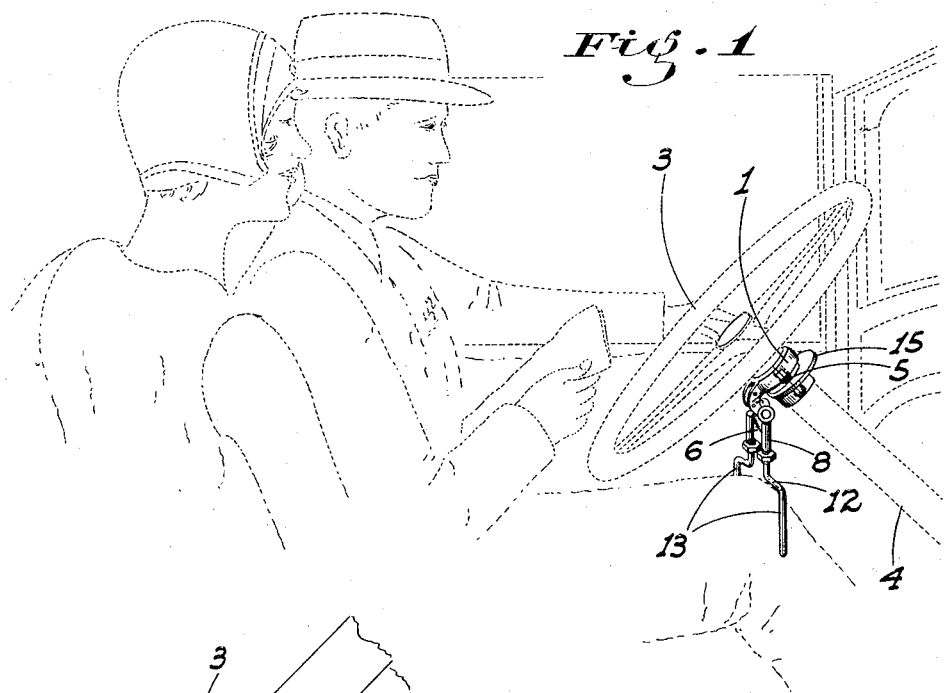
Fig. 1 is a fragmentary perspective outline of the driver's compartment of a motor vehicle showing the knee control attachment mounted in connection with the steering wheel.
Figure 2:
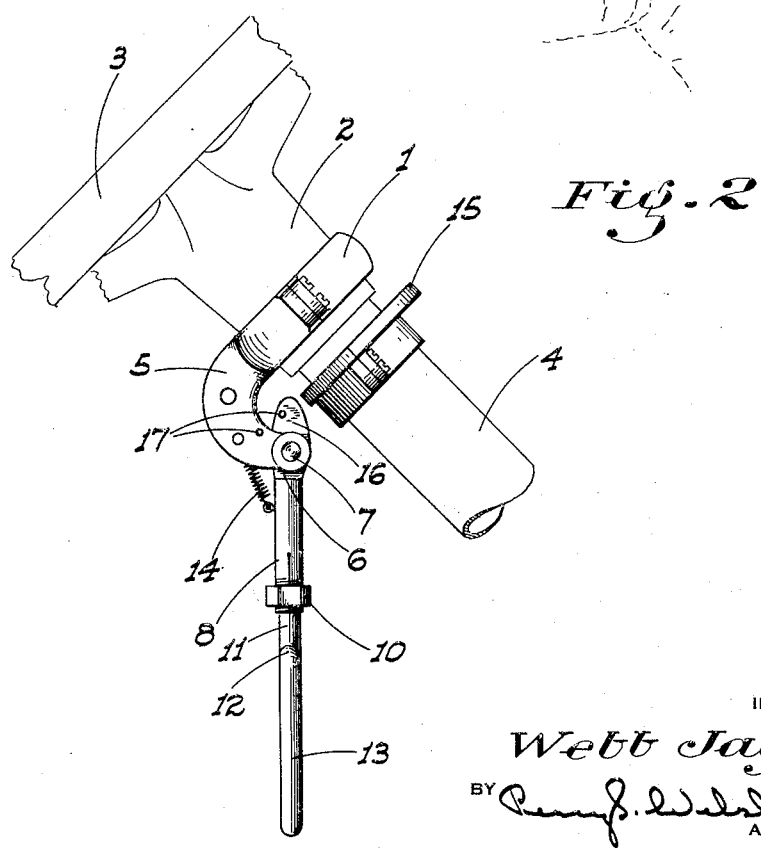
Fig. 2 is a side elevation of the attachment in its normal operating position.

Projecting outwardly and downwardly from one side of the ring are transversely spaced ears 5 between which a block 6 is disposed which is pivoted to the ears by a pin 7 or the like. Rigidly secured to and extending along the side edges of the block radially of the pin are sleeves or sockets 8. These sleeves are longitudinally split at their outer ends as at 9, which ends are threaded and are engaged by clamping nuts 10. Stems 11 are slidably and turnably mounted in the sleeves, the stems at their outer ends having oppositely extending lateral offset portions 12. At the outer ends of said portions the knee engaging extensions 13 are formed, which are parallel to the stems 11. The spacing between the extensions is sufficient to receive the knee therebetween as shown in Fig. 1. By reason of the particular adjustable mounting of the stems as described the spacing between the extensions may be altered by rotating the stems in opposite directions, and the distance of the extensions from the block 6 and consequently from the steering wheel hub may be independently altered by moving the stems in or out of their supporting sleeves. The knee engaging elements may therefore be adjusted to accommodate any driver.

A tension spring 14 between the block 6 and the ears 5 and preferably detachable at one end, yieldably holds the relatively movable unit of the attachment at a certain angle to the steering post. To positively pull said unit toward the post so that it will lie close against the same when the steering wheel is swung through a large arc, as when making a sharp turn, I provide the following device.

Figure 3:
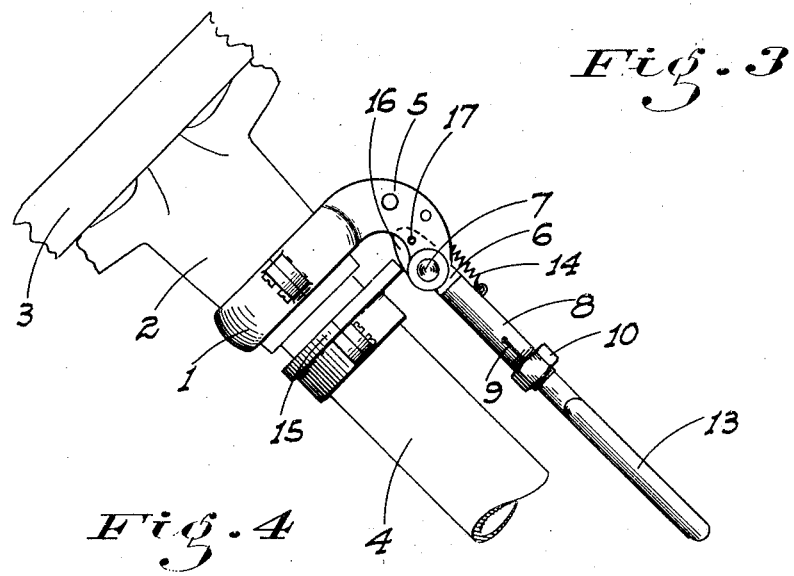
Fig. 3 is a similar view showing the positioning of the parts of the attachment when the steering wheel has been given a half turn.
Figure 4:
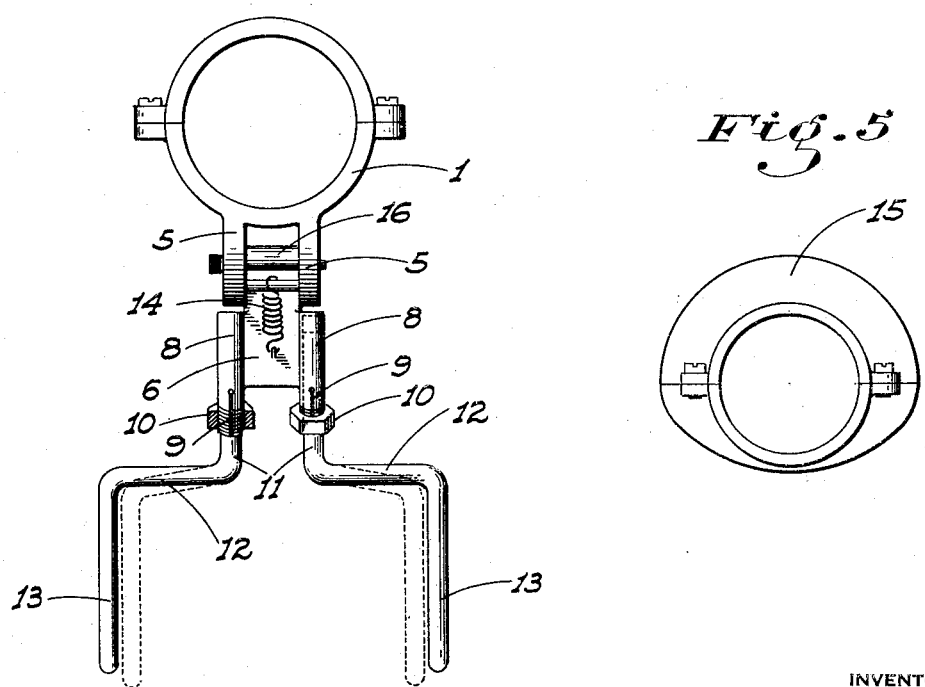
Fig. 4 is a top plan view of the attachment detached.
Figure 5:
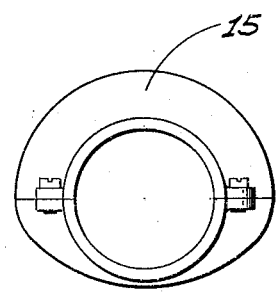
Fig. 5 is a bottom plan view of the cam member detached.

Mounted on the post 4 adjacent the hub 2 is a cam 15 which is adapted to engage an extension 16 formed on the inner end of the block 6 in front of its pivot. The cam and extension are arranged relative to each other so that when the steering wheel is in its normal position or close to such position, the cam will not engage the extension. When, however, the wheel is turned a relatively great amount the cam engages the extension in a manner to turn the block, and consequently the knee engaging unit toward the steering post, so that said unit will lie substantially parallel to the post as shown in Fig. 3. The unit is thus moved out of the way and held from assuming a relatively upright position as would otherwise be the case and in which position it would very possibly catch against the overhang above the dash board or some similar fixture of the car.

In case it is desired to maintain the knee engaging unit out of the way or parallel to the steering post at all times irrespective of the operation of the cam, I provide holes 17 through the extension 16 and the ears 5 which match when the movable unit is in said position. A pin 18 for engagement with these holes when desired may be detachably supported by the ears or elsewhere in a position convenient for use when necessary.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A knee control attachment for a motor vehicle steering wheel comprising a clamp adapted to be secured about the hub of the wheel, a unit secured to and depending from the clamp, said unit including spaced elements to receive a knee therebetween, and means to alter the spacing between said elements at will.

2. A knee control attachment for a motor vehicle steering wheel comprising a clamp adapted to be secured about the hub of the wheel, a unit secured to and depending from the clamp, said unit including spaced elements to receive a knee therebetween, means to alter the spacing between said elements and means to independently alter their distance from the clamp at will.

3. A knee control attachment for a motor vehicle steering wheel comprising a clamp adapted to be secured about the hub of the wheel, a block secured to and depending from the clamp, sleeves rigid with the block on opposite sides of the same, rods turnably and slidably mounted in the sleeves, laterally bent portions on the outer ends of the rods, knee engaging elements depending parallel to the rods from the outer ends of said portions, and means to clamp the rods against movement in the sleeves.

4. A knee control attachment for a motor vehicle steering mechanism which includes a steering wheel and a relatively stationary steering post; said attachment comprising a member adapted to be secured to the hub of the wheel, a knee engaging device depending from the member and pivoted thereon for swinging movement to and from the post, said device normally lying at an angle to the post, and means functioning with the rotation of the wheel a predetermined amount in either direction from its normal position for moving said device to a position adjacent and substantially parallel to the post.

5. A knee control attachment for a motor vehicle steering mechanism which includes a steering wheel and a relatively stationary steering post; said attachment comprising a member adapted to be secured to the hub of the wheel, a knee engaging device depending from the member and pivoted thereon for swinging movement to and from the post, said device normally lying at an angle to the post, a cam adapted to be mounted on the post above the plane of the pivot connection of the device, and an element rigid with said device above its pivot to be engaged and pushed back by the cam with the turning of the wheel a predetermined amount in either direction from its normal position.

In testimony whereof I affix my signature.

WEBB JAY.